June 1, 1948. B. A. ANDREWS 2,442,393
MAGNETIC TESTING MEANS
Filed Oct. 4, 1943 2 Sheets-Sheet 2
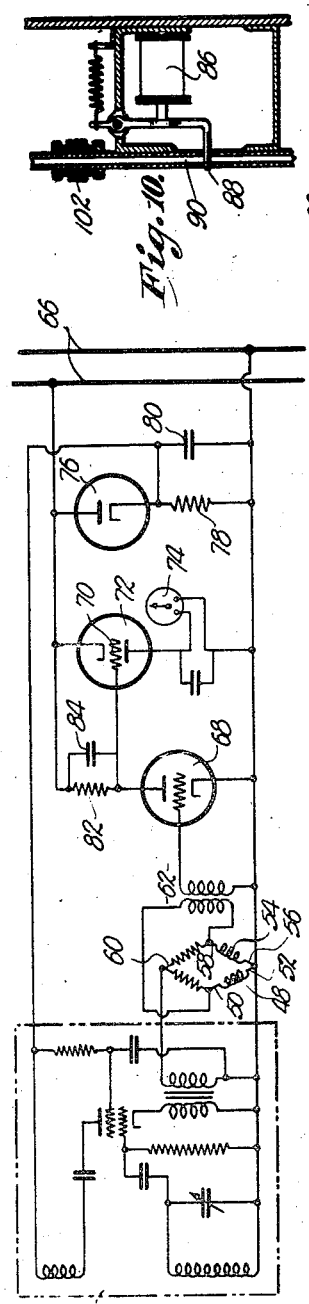
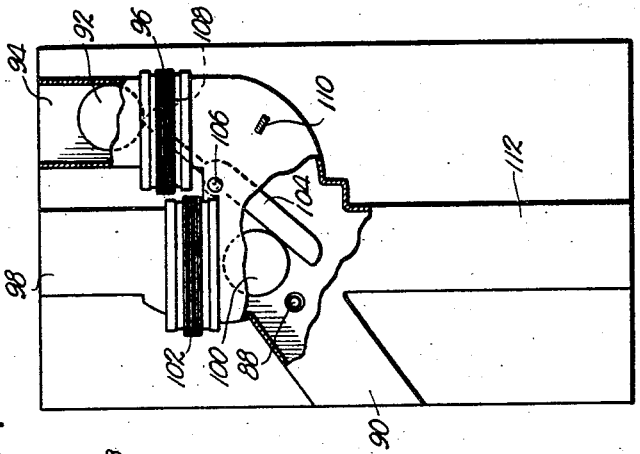
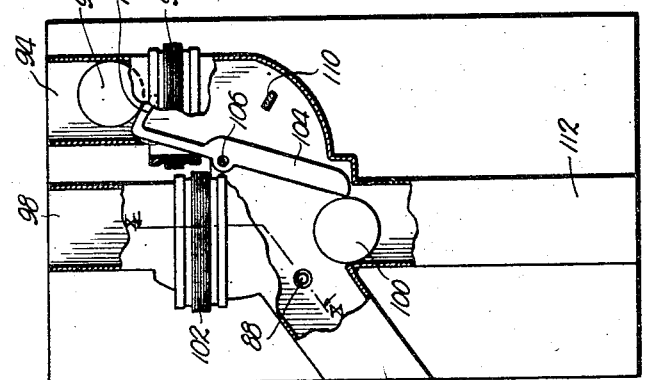
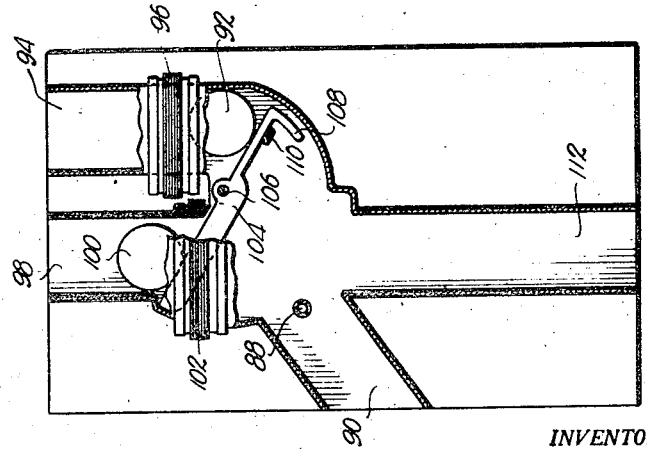
INVENTOR.
Boley A. Andrews
BY
ATTORNEY Patented June 1, 1948

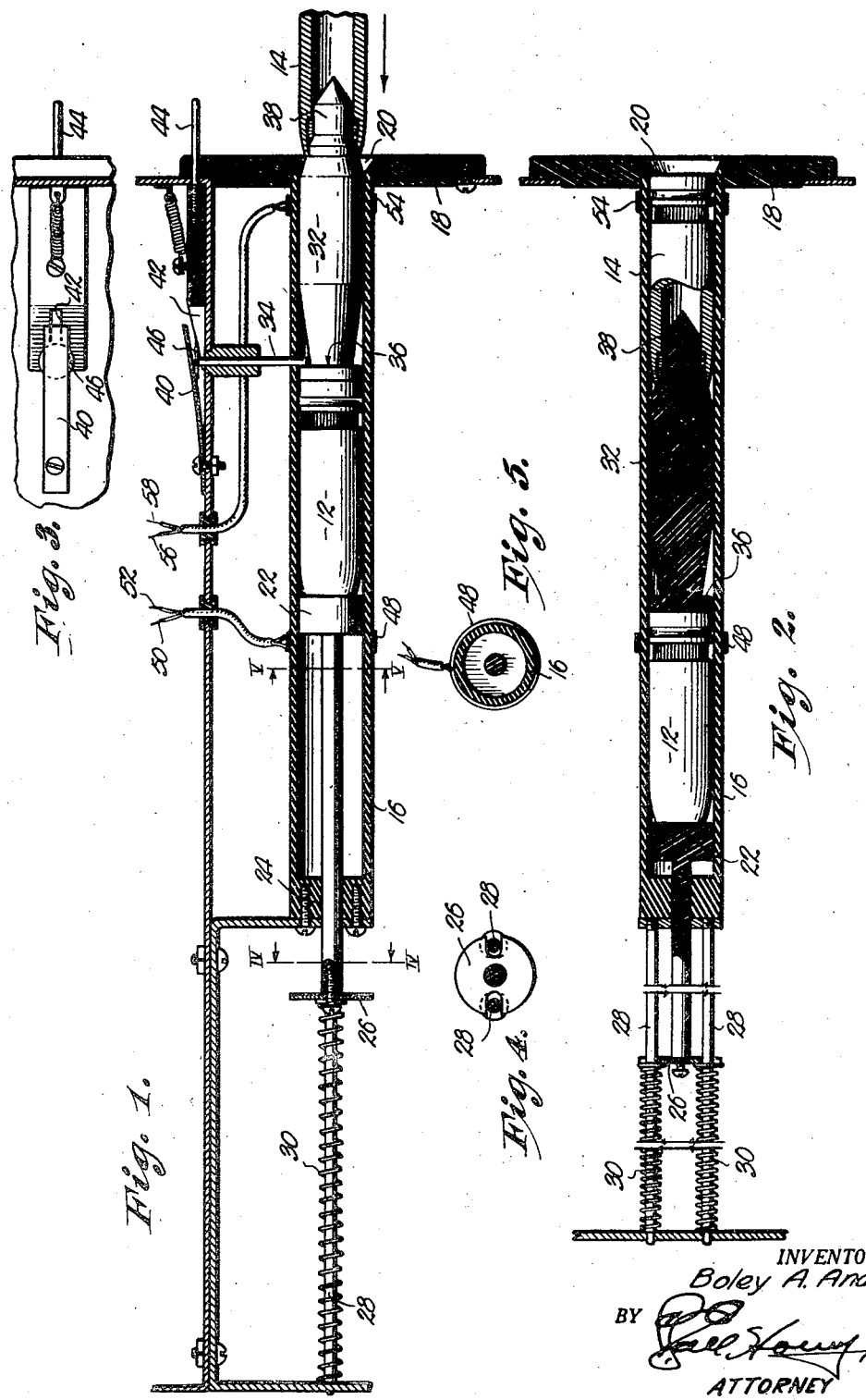

2,442,393

UNITED STATES PATENT OFFICE 2,442,393

MAGNETIC TESTING MEANS

Boley A. Andrews, Kansas City, Mo., assignor to C. Earl Hovey, trustee, Kansas City, Mo.

Application October 4, 1943, Serial No. 504,871

1 Claim. (Cl. 175—183)

This invention relates to article testing apparatus of the character employing novel electrical means for indicating the presence of flaws, variations in size or contour from a desired standard, and the presence of material foreign to that intended to be present.

One of the important objects of the present invention is the provision of a method and means for testing articles, which includes the employment of a pair of identical coils suitably charged and relatively short with respect to the article being tested, to the end that sections of the article are tested and compared with like sections of a standard specimen.

Further aims of this invention include means for testing articles which embody unique apparatus for reciprocably holding a standard specimen of the articles being tested, in proper position with respect to a relatively short coil for movement therethrough as the articles are successively passed through an identical coil to determine any difference in core losses due to a variation between identical sections of the standard specimen and the article being tested.

A still further object of the invention is to provide equipment of the aforementioned character, capable of use for testing such articles as shells, coins, and machine parts of various forms and sizes, the testing whereof is accomplished by comparing with a previously selected standard with the articles as they are successsively passed through a coil of special type, to the end that an unbalanced condition will cause work to be done resulting in a indication that the tested article is unlike the selected specimen.

Other objects of the invention and special uses to which the same may be put, will appear during the course of the following specification, referring to the accompanying drawings, wherein:

Fig. 1 is a fragmentary sectional view through the apparatus for testing articles, made in accordance with the present invention.

Fig. 2 is a similar view illustrating the specimen and article being tested in a position different from that shown in Fig. 1.

Fig. 3 is a fragmentary top plan view of a portion of the trigger mechanism for releasably maintaining the spacer in the operative position.

Fig. 4 is a sectional view taken on line IV—IV of Fig. 1, looking in the direction of the arrows.

Fig. 5 is a detailed cross sectional view taken on line V—V of Fig. 1, looking in the direction of the arrows.

Fig. 6 is a wiring diagram illustrating the electrical circuit employed in the apparatus.

Fig. 7 is a diagrammatical fragmentary sectional view through the testing equipment made in accordance with the present invention, and showing the same embodied in a coin testing machine.

Fig. 8 is a similar view illustrating another position of the coin being tested and the specimen with which it is being compared.

Fig. 9 is a similar view illustrating the position from which a coin, unlike the standard, passes to a branch tube; and Fig. 10 is a detailed sectional view taken on line X—X of Fig. 8 and looking in the direction of the arrows.

The testing equipment illustrated in the accompanying drawing, clearly indicates the manner in which the prime objects of this invention may be embodied in practical machines, and when the equipment is used in testing shells, for example, the same may be made to include structure for holding a standard specimen 12 that is to serve as a means of comparing the character of article 14. A tube 16 of insulating material supported within case 18 has one end in register with an opening 20 formed in the side of case 18. This tube has a plunger 22 reciprocally journalled in a bearing 24 formed in one end of tube 16. Plunger 22 is secured to notched plate 26 riding over a pair of parallel bars 28 with which is associated springs 30 to yieldably maintain plunger 22 at the end of its path of travel, shown in Fig. 1.

When standard specimen 12 is in place and spacer 32 is disposed within tube 16, pin 34 will lie against shoulder 36 of spacer 32 and form a stop for the inward movement of plunger 22. Specimen 12 lies between the inner end of spacer 32 and the outer face of plunger 22.

Spacer 32 is specially formed in that it has a stem 38 normally projected beyond the confines of case 18. This stem 38 becomes a guide for the article 14 being tested when the article is hollow in nature, such as illustrated in the drawings. The hollow articles 14, in this case, are shells being tested for imperfections or variations in dimension.

Pin 34 is maintained in place by spring 40 and when it is necessary to replace spacer 32, release shoe 42 is pressed inwardly by engagement with rod 44. Release shoe 42 is provided with an inclined upper face that passes beneath head 46 on pin 34, and when pin 34 is lifted beyond a position behind shoulder 36, springs 30 will force spacer 32 outwardly from tube 16. The force of springs 30 will likewise dislodge the standard specimen 12 from its normal position and replacement may occur as desired.

A coil 48 relatively short with respect to standard specimen 12 is mounted upon tube 16 by having the wire forming the same, wrapped around the outer face of tube 16. Wires 50 and 52 lead from this coil 48 and form a part of the circuit illustrated in Fig. 6.

Another coil 54 of identical nature to coil 48 is formed upon tube 16 in spaced relation with coil 48. The distance between these coils must be exact and determined by the length of standard specimen 12 and spacer 32.

Wires 56 and 58 connect coil 54, as shown in Fig. 6 to other parts of the electrical circuit. The electrical circuit diagrammatically illustrated in Fig. 6, may be used with the form of the invention shown in Figs. 1 to 5 inclusive, as well as with the modified form of the invention illustrated in Figs. 7 to 10 inclusive, and which is more fully hereinafter described.

This circuit includes a balanced bridge of conventional character, and broadly designated by the numeral 60. Coils 48 and 54 are a part of this bridge and the latter is joined to transformer 62 to provide a common grounding point for the output of the bridge circuit.

A standard oscillator 64 joined to supply lines 66 has an output preferably above 5,000 cycles A. C. Amplifying tube 68 is connected to the secondary of transformer 62 to set up the voltage which is applied to the grid 70 of tube 72. The output of tube 72 actuates a meter 74 that is mounted upon any part of case 18 within the line of vision of the operator.

Tube 76 rectifies the A. C. voltage from lines 66 and provides the "B" voltage for oscillator 64. A resistor 78 and condenser 80 establishes a filter net work in the circuit as do resistor 82 and condenser 84. Any unbalanced condition between coils 48 and 54 will be reflected in the movement of the indicator of meter 74, and in the event the invention is embodied in mechanical equipment having the characteristics of testing coins, as shown in Figs. 7 to 10 inclusive, the meter is replaced by a solenoid 86, the energization of which withdraws gate 88 from a position closing chute 90, serving as a means for ejecting coins from the apparatus that do not have the qualifications of the standard specimen 92 carried within tube 94.

Tube 94 has a coil 96 formed therearound that is appreciably shorter than the diameter of standard specimen 92. This coil 96 is insulated from tube 94 and is a part of the bridge circuit illustrated in Fig. 6 when coin handling or testing equipment is used in the circuit illustrated therein.

Tube 98 receives the articles to be tested, in this case, the coil which the operator drops into the tester. This coin 100 passes through tube 98 that is circumscribed by coil 102 insulated from tube 98 and forming a part of the bridge in the manner just described with respect to coil 96. These coils 96 and 102 are identical and are balanced when nothing is passed therethrough to establish a core loss.

Rocker arm 104 pivotally mounted as at 106 has one end thereof provided with a head 108. A stop 110 maintains arm 104 in the normal position shown in Fig. 7, when standard specimen 92 is in place and the equipment is ready for receiving an article 100 to be tested.

At the beginning of the movement of standard specimen 92 an article 100 through their respective coils the relative positions of these parts 92 and 100 with respect to their coils 96 and 102 is as illustrated in Fig. 7.

The position of standard specimen 92 is such that it does not lie within the confines of coil 96 nor close enough to influence the same by producing eddy currents in the core thereof. Chute 112 receives tested article 100 in the event it is identical in nature with the standard specimen 92. If the article being tested is not like the standard specimen, there will be a differential in core losses between coils 96 and 102 as standard specimen 92 and the article being tested pass therethrough. Such differential in core loss will cause an energization of solenoid 86 which will result in the withdrawal of gate 88 from chute 90, whereupon the tested article 100 will pass therethrough and thence to a desirable point of collection. As soon as the rejected article 100 passes through chute 90, rocker arm 104 will move back to the normal position by virtue of the weight of standard specimen 92.

Like cross sections of the coins will pass through the respective coils 96 and 102, and therefore, a much finer analysis of the article being tested will be made than if the effect of the entire coin were allowed to influence the core of coil 102 through which it passes. It has been found in practice, that some slug ejectors employing a magnetic field will allow spurious coins to pass if their bodies as a whole are altered to simulate a standard coin. Upon employing relatively short coils, any type of spurious coin will be detected.

The operation of the mechanism shown in the modified form of the invention, illustrated in Figs. 7 to 10 inclusive, has been made clear and the manner of testing shells or other articles through the arrangement of parts shown in Figs. 1 to 5 inclusive, will become apparent after an understanding of the aforesaid description of the coin tested apparatus.

Standard shell 12 passes through coil 48 simultaneously with the passage of article 14 through its coil 54, and thereby a sectional analysis made. If any part of the article being tested does not agree in character with the similar part of the standard specimen 12, then the pointer of meter 74 will be deflected and the article being tested may be handled accordingly. When standard specimen 12 is in its normal position, it should be far enough away from coil 48 to not influence the core thereof and the length of spacer 32 is such as to require article being tested (14) to enter its coil 54 simultaneously with the entrance of specimen 12 into the confines of its coil 48. Coils 48 and 54 are energized by a current having a frequency in the range of from 5,000 to 10,000 cycles because the change in inductance or core loss is more readily noticeable with such high voltages. The high frequency also lends an advantage in that the coils 48 and 54 or 96 and 102, as the case may be, may be made shorter or with fewer turns therein, and since the relatively short coils are highly desirable and necessary to the proper function of apparatus embodying this invention, any current available should be increased to a frequency range as above set down, by oscillator unit 64. The output of oscillator unit 64 is, of course, an A. C. current and so long as the circuit is balanced as illustrated in Fig. 6, and the standard specimens are maintained away from their respective coils, so as not to influence the same, the testing of the articles to be compared with the standard specimen, will be accurate and effective. Core losses, of course, occur when the standard specimen and article being tested, pass through their respective coils, but so long as the core loss is balanced, no work will be performed by way of moving a meter pointer or actuating a solenoid to assist in the desired deposition of rejected tested articles.

Because of the character of the invention, it is possible to embody the same in apparatus having characteristics other than those described, and therefore, the diagrammatical illustration in the drawings has been used to disclose the utility to one skilled in the art the manner of employing the invention in a practical manner.

Having thus described the invention, what is claimed as new and desired to be secured by Letters Patent is:

In an article testing apparatus of the character described, a pair of relatively short coils; structure for holding a standard specimen of the article for movement to and from a point of beginning through one of the coils; means for mounting an article being tested for manually moving the same through the other of said coils simultaneously and in coordinated relationship with the standard specimen; means operable by the passage in one direction of the article being tested through said other coil, for moving in one direction, the standard specimen through its coil; and elements on the structure for returning the standard specimen to its point of beginning, said elements including a spring loaded plunger having one end thereof bearing against the said specimen.

BOLEY A. ANDREWS.

REFERENCES CITED

The following references are of record in the file of this patent:

UNITED STATES PATENTS

| Number | Name | Date |
|---|---|---|
| 692,318 | Litot et al. | Feb. 4, 1902 |
| 1,129,584 | Murphy | Feb. 23, 1915 |
| 1,638,174 | Stoughton | Aug. 9, 1927 |
| 1,800,676 | Burrows et al. | Aug. 14, 1931 |
| 1,823,810 | Wall | Sept. 15, 1931 |
| 1,957,222 | Mershon | May 1, 1934 |
| 2,234,456 | Schaurte | Mar. 11, 1941 |
| 2,237,254 | Broekhuysen | Apr. 1, 1941 |
| 2,264,433 | Buccicone | Dec. 2, 1941 |
| 2,313,516 | Brubaker et al. | Mar. 9, 1943 |
| 2,357,512 | Gaiser | Sept. 5, 1944 |